United States Patent
Jain et al.

(10) Patent No.: US 10,846,896 B2
(45) Date of Patent: Nov. 24, 2020

(54) AUTOMATIC GENERATION OF MULTIPLE DOCUMENT LAYOUTS WHILE MAINTAINING IMAGE FOCUS

(71) Applicant: Adobe Inc., San Jose, CA (US)

(72) Inventors: Sanyam Jain, Delhi (IN); Gaurav Bhargava, Uttar Pradesh (IN); Mainak Biswas, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 114 days.

(21) Appl. No.: 16/168,495

(22) Filed: Oct. 23, 2018

(65) Prior Publication Data
US 2020/0126277 A1      Apr. 23, 2020

(51) Int. Cl.
*G06T 11/60*      (2006.01)
*G06T 3/40*       (2006.01)
(Continued)

(52) U.S. Cl.
CPC .......... *G06T 11/60* (2013.01); *G06T 3/40* (2013.01); *G06T 7/11* (2017.01); *G06T 7/194* (2017.01); *G06T 2210/22* (2013.01)

(58) Field of Classification Search
CPC ........ G06N 20/00; G06N 3/08; G06N 3/0454; G06N 3/02; G06N 3/0472; G06N 7/005; G06N 3/088; G06N 3/006; G06N 5/02; G06N 3/126; G06N 20/20; G06T 2207/20081; G06T 2207/20084; G06T 7/0002; G06T 7/0014; G06T 7/20; G06T 2207/30168; G06T 2207/20076; G06T 15/205; G06T 2207/10012; G06K 9/4628; G06K 2209/05; G06K 9/00369; G06K 9/46; G06K 9/6262; G06K 9/00147; G06K 9/00302; G06K 9/0063; G06K 9/325; G16H 30/40; G06F 16/55
See application file for complete search history.

(56) References Cited

U.S. PATENT DOCUMENTS

| | | | | |
|---|---|---|---|---|
| 2012/0243802 A1* | 9/2012 | Fintel | ................... | H04N 5/2625 382/284 |
| 2014/0123237 A1* | 5/2014 | Gaudet | ................... | H04L 63/08 726/4 |
| 2014/0176786 A1* | 6/2014 | Iwasaki | .............. | H04N 5/23212 348/351 |

OTHER PUBLICATIONS

Ngo, David Chek Ling, et al., "Evaluating Interface Esthetics", Springer Link, Knowledge and Information Systems, vol. 4, Issue 1, Jan. 2002, 34 pages.

* cited by examiner

*Primary Examiner* — Quan M Hua
(74) *Attorney, Agent, or Firm* — Kilpatrick Townsend & Stockton LLP

(57) ABSTRACT

Systems and methods for the automatic creation of multiple image layouts. In an example, an image processing application creates an output layered image from an input layered image that includes a background object, a foreground object, and a focus area that at least partially overlaps with the foreground object. The image processing application applies a scaling factor to the foreground object such that the foreground object either is entirely contained within the output foreground object or one dimension of the foreground object is contained within the output foreground object. The image processing application further determines an output focus area in the output foreground object by applying the scaling factor to the focus area. The image processing application crops the foreground object such that the focus area is contained within the output foreground object, thereby creating the output layered image.

20 Claims, 6 Drawing Sheets

(51) Int. Cl.
*G06T 7/194* (2017.01)
*G06T 7/11* (2017.01)

AUTOMATIC GENERATION OF MULTIPLE DOCUMENT LAYOUTS WHILE MAINTAINING IMAGE FOCUS

TECHNICAL FIELD

This disclosure relates generally to image processing. More specifically, but not by way of limitation, this disclosure relates to automatic creation of additional layered images that maintain a design aesthetic of an input image.

BACKGROUND

Working on a graphic design project often involves creating multiple layouts from a single piece of artwork such as an image or document. For example, a designer could create different versions of an image for different parts of a webpage, for different screen sizes, or using different languages. The different layouts may contain similar—but not necessarily identical—assets such as layers, images, or text, for example due to different constraints for online or print.

Existing solutions for automatically creating multiple layered images from a single layered image or document use automatic cropping solutions. But such approaches are either unable to crop objects from the image in such a way as to maintain the design sense or visual appeal of the original artwork or can require manual intervention.

Accordingly, solutions are needed for the automatic creation of additional layouts of layered images.

SUMMARY

Systems and methods are disclosed herein for the automatic creation of multiple layouts. In an example, an image processing application accesses an image including a background object, a foreground object, and a focus area that at least partially overlaps with the foreground object. The image processing application generates an output background object by adjusting the background object to an output image having an output size. The image processing application fits the foreground object to an output foreground object by applying a scaling factor to the foreground object such that the foreground object either is entirely contained within the output foreground object or one dimension of the foreground object is contained within the output foreground object. The image processing application further determines an output focus area in the output foreground object by applying the scaling factor to the focus area. The image processing application crops the foreground object such that the focus area is contained within the output foreground object. The image processing application combines the output background object, the cropped foreground object, and the output focus area into the output image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
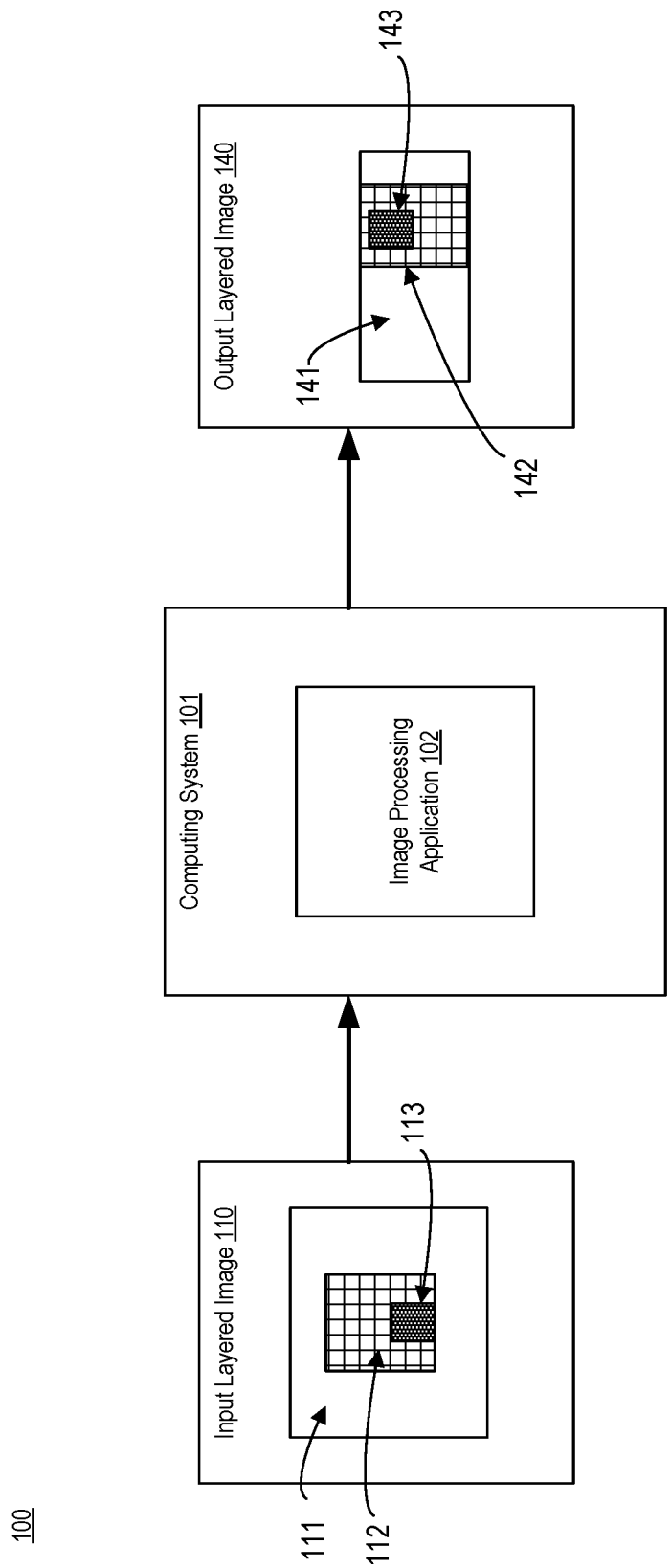
FIG. 1 is a diagram depicting an example of application components used for creating an additional layout of a layered image, according to an embodiment of the present disclosure.

As discussed above, existing techniques for creating additional layouts from layered images are either unable to crop objects from the image in such a way as to maintain the design sense or visual appeal of the original artwork or can require manual intervention. In contrast, systems and methods described herein efficiently and effectively create different layouts of a layered image that maintain a design aesthetic of an image by ensuring that a focus area is correctly propagated to the output image. In so doing, certain embodiments provide improvements to multi-channel publishing. Multi-channel publishing includes publishing content for print and online and variations thereof such as different layout sizes necessitated by a multitude of screen-sizes for target devices.

The following non-limiting example is provided to introduce certain embodiments. In an example, a designer uses an image processing application to create an input layered image for a first screen size. The layered image, rectangular in shape, includes a background object that fills the entire layered image and a foreground object is rectangular and centered within the layered image. The foreground object is a headshot of a person. The image processing application receives input from the designer designating the face of the headshot as a focus area, or a point of interest.

Based on input from the designer, the image processing application creates a square-shaped output layered image for a second screen size. The output layered image includes an output background object and an output foreground object that is a smaller square centered in the upper right corner of the output layered image. The image processing application propagates the background object to the output image and adjusts the foreground object such that the foreground asset is entirely contained within the image (i.e., the foreground image is smaller than the output image), or one dimension of the foreground asset is contained within the output image. The image processing application determines that the focus area is not contained within the output foreground object and adjusts the scaling of the foreground object such that the focus area is contained within the output image.

Certain Definitions

As disclosed herein, "layered image" or "image" refers to an electronic representation of text, images, user interface elements, and the like. Examples of documents include Adobe® Photoshop® documents, Adobe® Illustrator® documents, Adobe® InDesign® documents, vector based documents, text-based documents, banners used for advertisements, and web-based technologies such as Flash® or Shockwave®. A document can include one or more objects or assets. Each object can have one or more properties such as a container or content that is stored within, such as an image. A document can include a manifest that includes object information.

As disclosed herein, "object" refers to a discrete component of a document. Example objects include images, text boxes, background objects, call-to-actions, descriptions, headings, heroes, logos, or sub-headings. Objects can be independently analyzed, removed from a document, or propagated to another document.

As disclosed herein, "focus area" refers to a specific area of an object, such as a foreground object. A focus area is viewed by a designer as having a higher relative importance than other areas of an object. An example of a focus area is a face within a headshot.

As disclosed herein, "template" refers to a reference document that can be used as a basis for creating an additional layout of an input layered image. A template has a particular size and can include objects of various types, such as foreground or background objects. As explained further herein, a set of layout parameters that characterize a design aesthetic can be derived for a template.

Turning now to the Figures, FIG. 1 is a diagram depicting an example of application components used for creating an additional layout of a layered image, according to an embodiment of the present disclosure. FIG. 1 depicts document processing environment 100, which includes input layered image 110, computing system 101, and output layered image 140. Computing system 101, an example of which is shown in further detail in FIG. 6, executes image processing application 102.

Input layered image 110 includes one or more objects background objects or foreground objects. A foreground object can have a focus area. As depicted, input layered image 110 includes input background object 111 and input foreground object 112. Examples of input background object 111 are shading, images, and solid colors. Examples of input foreground object 112 are images of a person or images of an object. As depicted, input foreground object 112 includes focus area 113, designated as a focus area 113 by a designer.

Output layered image 140 includes output background object 141 and output foreground object 142. A designer can define parameters including a selection of a size and shape of output layered image 140, a selection of a shape, size, and location of output foreground object 142. Examples of layered images are further discussed with respect to FIG. 2. Output layered image 140 can be a predefined template of common or standard output images.

In an example, image processing application 102 creates output layered image 140 from input layered image 110 while maintaining focus area 113. Image processing application 102 propagates input background object 111 to output background object 141 by scaling input background object 111 appropriately to fit the size and shape of output layered image 140. Image processing application 102 transforms input foreground object 112 to fit output foreground object 142, thereby transforming focus area 113 to output focus area 143.

Further, image processing application 102 recognizes cases in which an applied scaling to input foreground object 112 causes the output focus area 143 to be removed from output foreground object 142 (for example, due to expansion beyond the bounds of output foreground object 142). In such a case, image processing application 102 adjusts the scaling factor, causing scaling or cropping of input foreground object 112 such that focus area 113 is maintained as output focus area 143 in output layered image 140.

Figure 2:
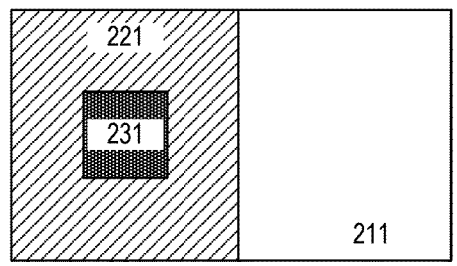
FIG. 2 is a diagram depicting examples of additional layouts of layered images, according to an embodiment of the disclosure.
Figure 2:
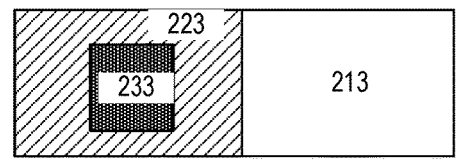
Figure 2:
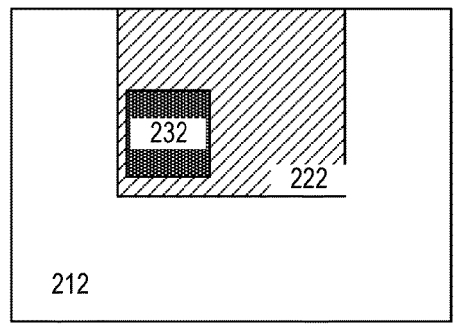
Figure 2:
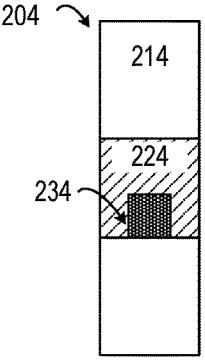

FIG. 2 is a diagram depicting examples of additional layouts of layered images, according to an embodiment of the disclosure. FIG. 2 depicts layered images 201-204. Layered images 201-204 are examples of inputs to image processing application 102, i.e., input layered image 110, and outputs from the image processing application 102, i.e., output layered image 140. Accordingly, image processing application 102 can analyze layered images 201-204, create layered images 201-204, or both. Layered images 201-204 are examples of predefined templates that can be stored and used by image processing application 102.

As can be seen from layered images 201-204, a variety of layout possibilities exist. More specifically, for a given layered image, which can be of any size or shape, a foreground object box can be positioned anywhere within the layered image and can be of any size or shape, and the focus area can be positioned anywhere within the foreground object box and can be of any size or shape. Additionally, a background image may or may not be present.

For example, layered image 201 includes background 211, foreground object 221, and focus area 231. Foreground object 221 is positioned on the left side of layered image 201 and is of the same height as layered image 201. Focus area 231 is centered within foreground object 221. Layered image 202 includes background 212, foreground object 222, and focus area 232. Foreground object 222 is positioned in the horizontal center, touching the top of layered image 202. Focus area 232 is positioned towards the bottom left of foreground object 221. Layered image 203 includes background 213, foreground object 223, and focus area 233. Foreground object 223 is positioned in the horizontal left of layered image 203 and is the same height as layered image 203. Focus area 233 is positioned in the center of foreground object 223. Finally, layered image 204 includes background 214, foreground object 224, and focus area 234. Foreground object 223 is positioned in the vertical center of layered image 204 and is the same width as layered image 203. Focus area 234 is positioned in the horizontal center and bottom of foreground object 224.

Figure 3:
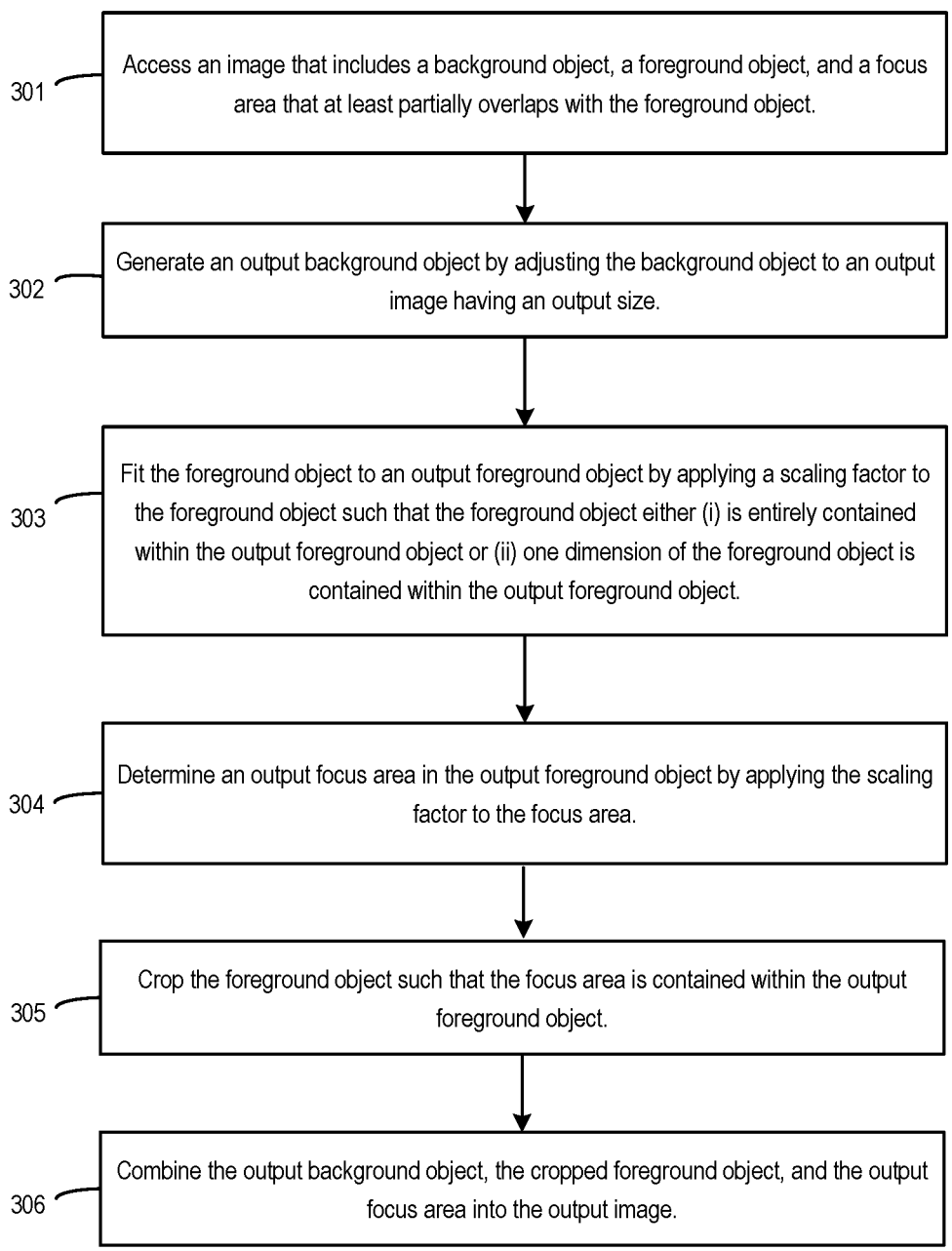
FIG. 3 depicts an example of a process for creating an additional layout of a layered image, according to an embodiment of the present disclosure.

FIG. 3 depicts an example of a process 300 for creating an additional layout of a layered image, according to an embodiment of the present disclosure. Image processing application 102 can execute process 300. For example purposes, FIG. 3 is discussed with respect to certain examples depicted in FIG. 4.

Figure 4:
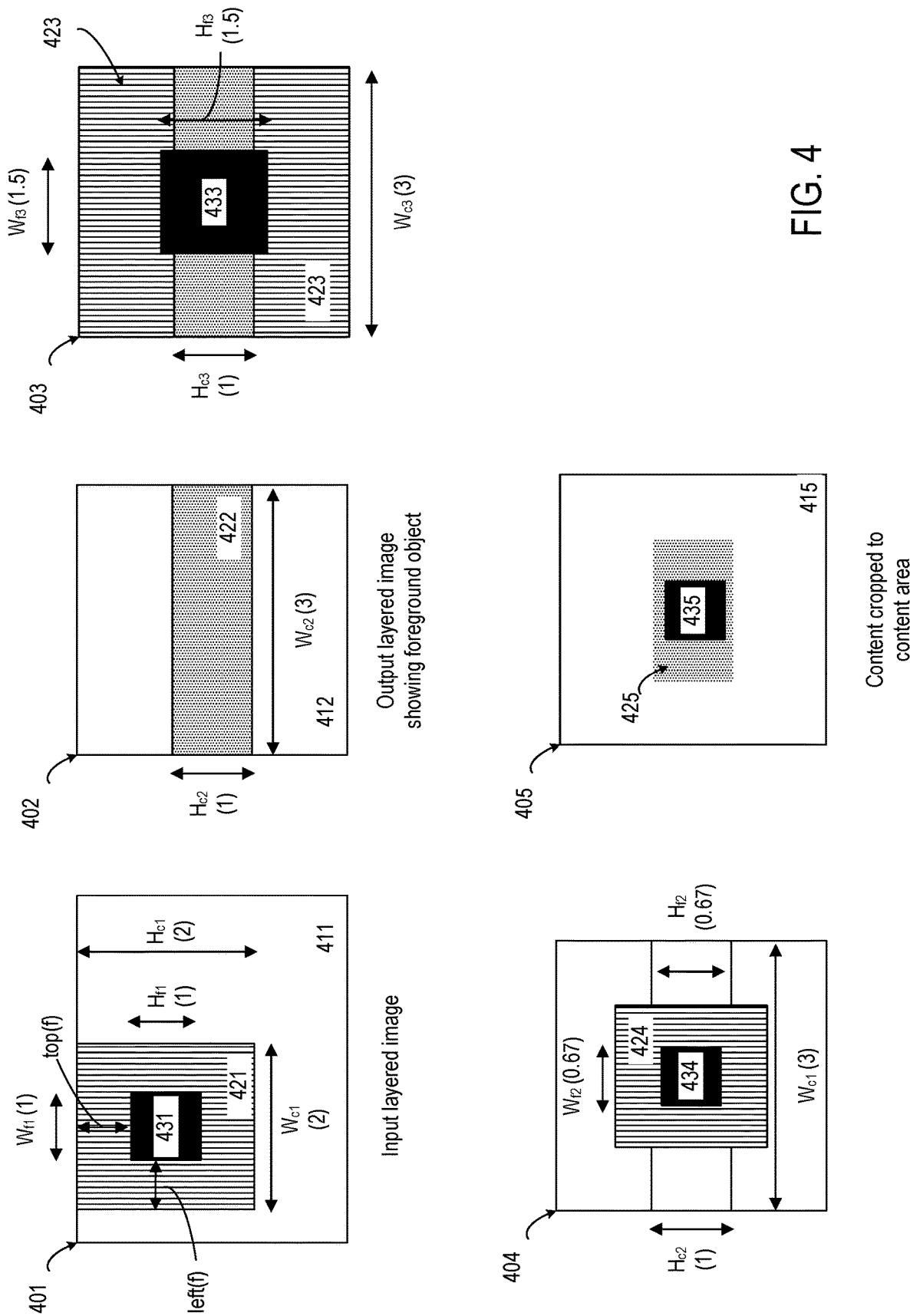
FIG. 4 further illustrates the process described in FIG. 3, according to an embodiment of the present disclosure.

FIG. 4 further illustrates the process described in FIG. 3, according to an embodiment of the present disclosure. FIG. 4 depicts layered images 401-405. Each of layered images 401-405 includes one or more of: a background object, a foreground object, and a focus point. Layered image 401 depicts an original input image, e.g., input layer image 110. Layered image 405 depicts an output of process 300, e.g., output layered image 140. Layered images 402-404 depict images at various intermediate stages of transformation by process 300.

At block 301, process 300 involves accessing an image that includes a background object, a foreground object, and a focus area that at least partially overlaps with the foreground object. Image processing application 102 accesses layered image 401. Image processing application 102 can receive layered image 401 from an external device or file, or can create layered image 401 by executing user drawing commands.

Layered image 401 includes background object 411, foreground object 421, and focus area 431. Foreground object 421 has height $H_{c1}$ (in this example, 2 units) and width $W_{c1}$ (in this example, also 2 units). As can be seen, focus area 431 is centered within foreground object 421. Focus area has height $H_{f1}$ (in this example, 1 unit) and width $W_{f1}$ (in this example, 1 unit).

At block 302, process 300 involves generating an output background object by adjusting the background object to an output image having an output size. Layered image 402 represents a desired output layered image and includes background object 412 and output foreground object 422. The dimensions of output foreground object 422 can be represented by height $H_{c2}$ (in this example, 1 unit) and width $W_{c2}$ (in this example, 3 units). As further explained output foreground object 422 represents the maximum dimensions of the output foreground object. Based on adjustments, scaling, or cropping performed at blocks 303-305 of process 300, the final output foreground object may be smaller than the bounds of output foreground object 422.

At block 303, process 300 involves fitting the foreground object to an output foreground object by applying a scaling factor to the foreground object such that the foreground object either (i) is entirely contained within the output foreground object or (ii) one dimension of the foreground object is contained within the output foreground object. Image processing application 102 propagates background object 411 to layered image 402 by placing background object 411 into background object 412, stretching or resizing background object 411 as necessary. Image processing application 102 adjusts foreground object 421 to fit output foreground object 422.

Image processing application 102 can determine the scaling factor by using different functions. For example, image processing application 102 can determine separate vertical and horizontal scaling factors. A horizontal scaling factor, if applied to foreground object 421, would adjust foreground object 421 to be the width of output foreground object 422 (possibly causing foreground object 421 to be cropped in the vertical dimension). Similarly, a vertical scaling factor, if applied to foreground object 421, would adjust foreground object 421 be to the height of output foreground object 422 (possibly causing foreground object 421 to be cropped in the horizontal dimension).

In an example, a horizontal scaling factor $S_w$ can be calculated by dividing the width of the output foreground object 422 by the width of the input foreground object 421, represented by the following equation:

$$S_w = \frac{W_{c2}}{W_{c1}}$$

Similarly, vertical scaling factor $S_h$ can be calculated by dividing the height of the output foreground object 422 by the height of the input foreground object 421, represented by the following equation:

$$S_h = \frac{H_{c2}}{H_{c1}}$$

Continuing the example, image processing application 102 determines horizontal scaling factor $S_w$ (in this example, 3/2=1.5) and vertical scaling factor $S_h$ (in this example 1/2=0.5).

The applied scaling factor can be determined by the maximum of horizontal scaling factor $S_w$ and vertical scaling factor $S_h$, e.g.:

$$S = \max(S_h, S_w)$$

Continuing the example, image processing application 102 selects $S_h$ as the scaling factor applies $S_h$ (which equals=1.5) to each dimension of foreground object $W_{c1}$ and $H_{c1}$.

$$W_{c3} = W_{c1} * S$$

$$H_{c3} = H_{c1} * S$$

Continuing the above example, image processing application 102 determines $W_{c3}$ and $H_{c3}$, which are each 3 units. As depicted in layered image 403, foreground object 423 is scaled such that its dimensions are 3 units×3 units.

At block 304, process 300 involves determining an output focus area in the output foreground object by applying the scaling factor to the focus area. Image processing application 102 applies scaling factor S, as applied to the foreground object 421, to focus area 431 in the following manner:

$$W_{f3} = W_{f1} * S$$

$$H_{f3} = H_{f1} * S$$

In some cases, the focus area will need no additional adjustment based on the scaling factor applied at block 303. In other cases, however, the scaling factor will be such that the focus area is cropped or is entirely outside of the foreground object. Layered image 403 depicts focus area 433. As can be seen, foreground object 423 is outside of the output foreground object 422 and focus area 433 is scaled accordingly. As can be seen, focus area 433 is scaled to be 1.5 units by 1.5 units, which is outside of output foreground object 422 in the vertical dimension.

In an embodiment, image processing application 102 determines that focus area 433 is not contained within the output foreground object and adjusts the scaling factor in one or more of (i) a horizontal direction or (ii) a vertical direction. More specifically, image processing application 102 calculates a new scaling factor:

$$S_1 = \min(S_{1w}, S_{1h})$$

where horizontal scaling factor $S_{1w}$ is calculated by the following equation:

$$S_{1w} = \frac{W_{c2}}{W_{f1} + \text{top}(f)}$$

and vertical scaling factor $S_{1h}$ is calculated by the following equation:

$$S_{1h} = \frac{H_{c2}}{H_{f1} + \text{left}(f)}$$

Where $W_{f1}$ and $H_{f1}$ are the width and height of the original focus bounds respectively, where top(f) indicates the distance from the top of the original focus bounds to the top of the original foreground object and left(f) indicates the distance from the left of the focus bounds to the left of the foreground object.

Continuing the example, image processing application 102 determines $S_{1w}$ to be 3/(1+0.5)=2 and $S_{1h}$ to be 1/(1+

0.5)=0.67. Image processing application 102 selects the minimum, $S_{1h}$, and applies $S_{1h}$ to the foreground object 421, thereby applying the scaling factor to the focus area 431. Layered image 404 represents the adjusted scaling prior to any cropping. As can be seen in layered image 404, focus area 434 is now entirely contained within foreground image 422.

At block 305, process 300 involves cropping the foreground object such that the focus area is contained within the output foreground object. Cropping may or may not be necessary, depending on the scaling factors applied at blocks 303-304. Layered image 405 includes foreground object 424 and focus area 435. Continuing the example, image processing application 102 crops foreground object 424, resulting in foreground object 425, and associated focus area 435.

At block 306, process 300 involves combining the output background object, the cropped foreground object, and the output focus area into the output image. Image processing application 102 combines background object 415, foreground object 425 and focus area 435.

Figure 5:
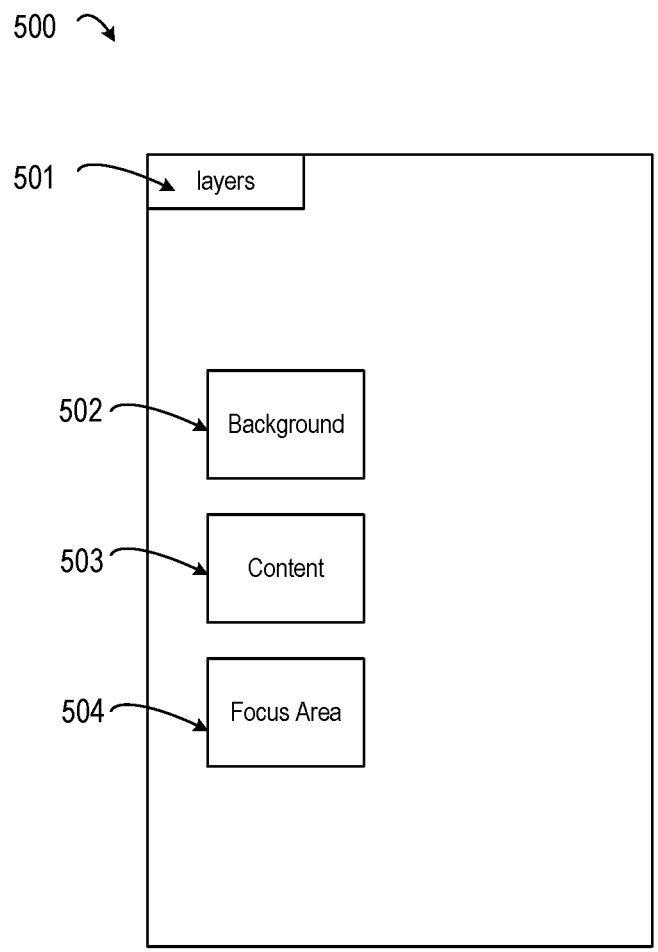
FIG. 5 depicts an example of a user interface for creating additional layouts of layered images, according to an embodiment of the present disclosure.

FIG. 5 depicts an example of a user interface for creating additional layouts of layered images, according to an embodiment of the present disclosure. User interface 500 depicts layer indicator 501, background layer button 502, content layer button 503, and focus area button 504. User interface 500 can be implemented via image processing application 102, by computing system 101, or by another computing system such as an external device. By activating one or more buttons 502-504, a user can select, show, or hide one or more layers. For example, user interface 500 can be invoked to select or create input layered image 110 or output layered image 140.

Figure 6:
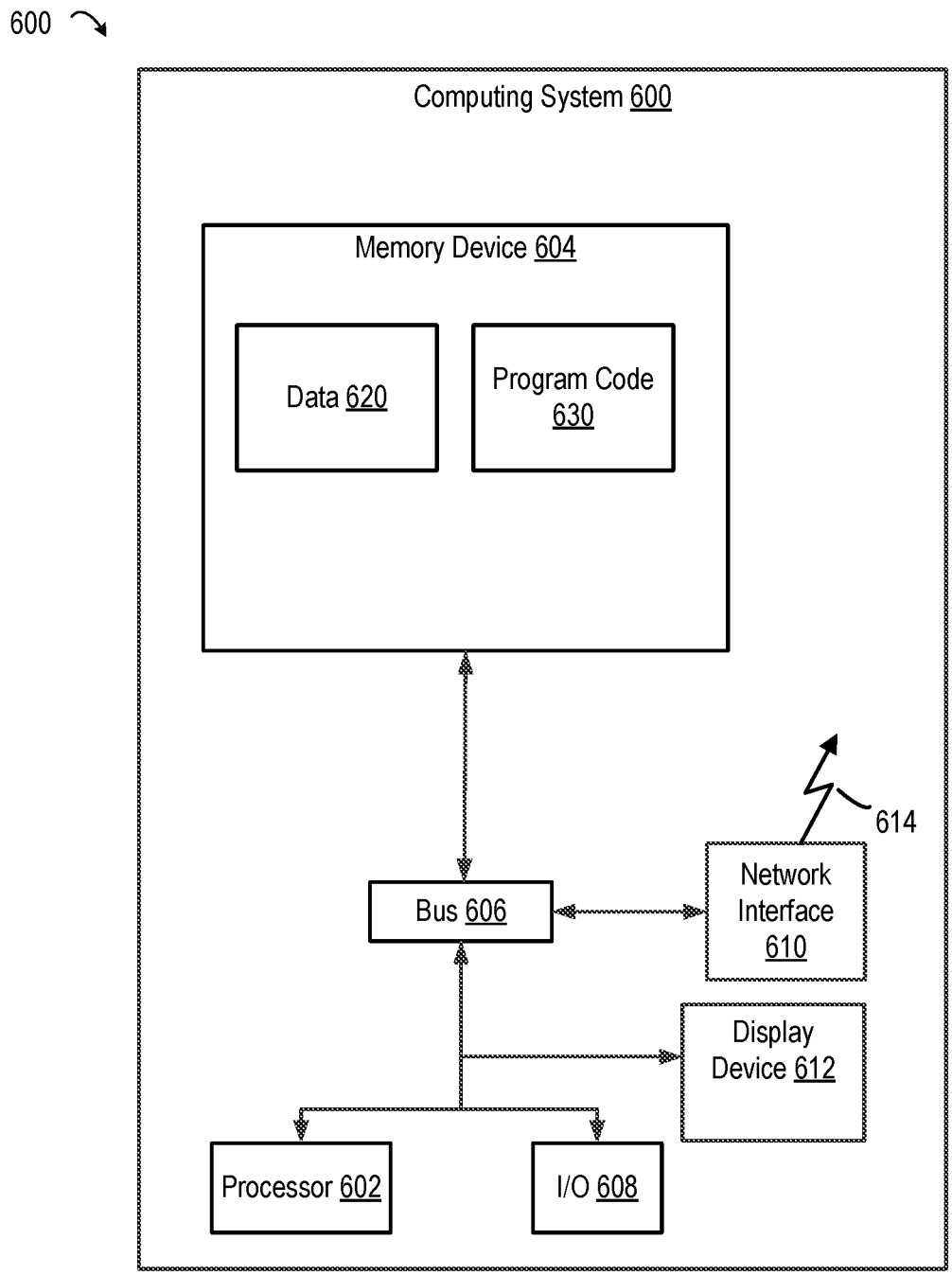
FIG. 6 depicts an example of a computing system for creating an additional layout of a layered image, according to an embodiment of the present disclosure.

FIG. 6 depicts an example of a computing system for creating an additional layout of a layered image, according to an embodiment of the present disclosure. Computing device 600 is an example of computing system 101 and can implement image processing application 102. Any suitable computing system may be used for performing the operations described herein. The depicted example of a computing device 600 includes a processor 602 communicatively coupled to one or more memory devices 604. The processor 602 executes computer-executable program code 630 stored in a memory device 604, accesses data 620 stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices or cores, including a single processing device. The functionality of the computing device may be implemented in hardware, software, firmware, or a combination thereof.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 600 may also include a number of external or internal devices, such as input or output devices. For example, the computing device 600 is shown with one or more input/output ("I/O") interfaces 608. An I/O interface 608 can receive input from input devices or provide output to output devices. One or more busses 606 are also included in the computing device 600. The bus 606 communicatively couples one or more components of a respective one of the computing device 600.

The computing device 600 executes program code 730 that configures the processor 602 to perform one or more of the operations described herein. For example, the program code 730 causes the processor to perform the operations described in FIG. 4, 6, or 7.

The computing device 600 also includes a network interface device 610. The network interface device 610 includes any device or group of devices suitable for establishing a wired or wireless data connection to one or more data networks. The network interface device 610 may be a wireless device and have an antenna 614. The computing device 600 can communicate with one or more other computing devices implementing the computing device or other functionality via a data network using the network interface device 610.

The computing device 600 can also include a display device 612. Display device 612 can be a LCD, LED, touch-screen or other device operable to display information about the computing device 600. For example, information could include an operational status of the computing device, network status, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
accessing an image comprising a background object, a foreground object, and a focus area that at least partially overlaps with the foreground object;
generating an output background object by adjusting the background object to an output image having an output size;
fitting the foreground object to an output foreground object by applying a scaling factor to the foreground object such that the foreground object either (i) is entirely contained within the output foreground object or (ii) one dimension of the foreground object is contained within the output foreground object;
determining an output focus area in the output foreground object by applying the scaling factor to the focus area;
cropping the foreground object such that the focus area is contained within the output foreground object; and
combining the output background object, the cropped foreground object, and the output focus area into the output image.

2. The method of claim 1, further comprising responsive to determining that the output focus area is not contained within the output foreground object, adjusting the scaling factor in one or more of (i) a horizontal direction or (ii) a vertical direction and applying the adjusted scaling factor to the foreground object and the focus area.

3. The method of claim 2, wherein the adjusted scaling factor is a minimum of (i) a horizontal scaling that causes a width of the focus area to equal a width of the output foreground object and (ii) a vertical scaling that causes a height of the foreground object to equal a height of the output foreground object.

4. The method of claim 1, wherein the scaling factor is calculated by determining a maximum of (i) a horizontal scaling that causes a width of the foreground object to equal a width of the output foreground object and (ii) a vertical scaling that causes a height of the foreground object to equal a height of the output foreground object.

5. The method of claim 1, wherein the background object, the foreground object, and the focus area are layers of the image.

6. The method of claim 1, wherein the output size and the output foreground object are received from a user device.

7. The method of claim 1, wherein the background object and the output foreground object are specified by a template from a set of predefined templates.

8. The method of claim 1, further comprising providing the output image to a display device.

9. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
accessing an image comprising a background object, a foreground object, and a focus area that at least partially overlaps with the foreground object;
generating an output background object by adjusting the background object to an output image having an output size;
fitting the foreground object to an output foreground object by applying a scaling factor to the foreground object such that the foreground object either (i) is entirely contained within the output foreground object or (ii) one dimension of the foreground object is contained within the output foreground object;
determining an output focus area in the output foreground object by applying the scaling factor to the focus area;
cropping the foreground object such that the focus area is contained within the output foreground object; and
combining the output background object, the cropped foreground object, and the output focus area into the output image.

10. The system of claim 9, the operations further comprising responsive to determining that the output focus area is not contained within the output foreground object, adjusting the scaling factor in one or more of (i) a horizontal direction or (ii) a vertical direction and applying the adjusted scaling factor to the foreground object and the focus area.

11. The system of claim 10, wherein the adjusted scaling factor is a minimum of (i) a horizontal scaling that causes a width of the focus area to equal a width of the output foreground object and (ii) a vertical scaling that causes a height of the foreground object to equal a height of the output foreground object.

12. The system of claim 9, wherein the scaling factor is calculated by determining a maximum of (i) a horizontal scaling that causes a width of the foreground object to equal a width of the output foreground object and (ii) a vertical scaling that causes a height of the foreground object to equal a height of the output foreground object.

13. The system of claim 9, wherein the background object, the foreground object, and the focus area are layers of the image.

14. A non-transitory computer-readable storage medium storing computer-executable program instructions, wherein when executed by a processing device, the computer-executable program instructions cause the processing device to perform operations comprising:
accessing an image comprising a background object, a foreground object, and a focus area that at least partially overlaps with the foreground object;
generating an output background object by adjusting the background object to an output image having an output size;

fitting the foreground object to an output foreground object by applying a scaling factor to the foreground object such that the foreground object either (i) is entirely contained within the output foreground object or (ii) one dimension of the foreground object is contained within the output foreground object;

determining an output focus area in the output foreground object by applying the scaling factor to the focus area;

cropping the foreground object such that the focus area is contained within the output foreground object; and combining the output background object, the cropped foreground object, and the output focus area into the output image.

15. The non-transitory computer-readable storage medium of claim 14, the operations further comprising responsive to determining that the output focus area is not contained within the output foreground object, adjusting the scaling factor in one or more of (i) a horizontal direction or (ii) a vertical direction and applying the adjusted scaling factor to the foreground object and the focus area.

16. The non-transitory computer-readable storage medium of claim 15, wherein the adjusted scaling factor is a minimum of (i) a horizontal scaling that causes a width of the focus area to equal a width of the output foreground object and (ii) a vertical scaling that causes a height of the foreground object to equal a height of the output foreground object.

17. The non-transitory computer-readable storage medium of claim 14, wherein the scaling factor is calculated by determining a maximum of (i) a horizontal scaling that causes a width of the foreground object to equal a width of the output foreground object and (ii) a vertical scaling that causes a height of the foreground object to equal a height of the output foreground object.

18. The non-transitory computer-readable storage medium of claim 14, wherein the background object, the foreground object, and the focus area are layers of the image.

19. The non-transitory computer-readable storage medium of claim 14, wherein the output size and the output foreground object are received from a user device.

20. The non-transitory computer-readable storage medium of claim 14, wherein the background object and the output foreground object are specified by a template from a set of predefined templates.

* * * * *